Feb. 1, 1927.

C. E. BEAN 1,615,865

DOMESTIC COOKING UTENSIL

Filed Aug. 27, 1926

INVENTOR:
CHARLES E. BEAN,
BY Robert Burns,
ATTORNEY.

Patented Feb. 1, 1927.

1,615,865

UNITED STATES PATENT OFFICE.

CHARLES EVANS BEAN, OF KANSAS CITY, KANSAS.

DOMESTIC COOKING UTENSIL.

Application filed August 27, 1926. Serial No. 131,824.

This invention relates to the covered type of domestic cooking utensils, and has for its object:

To provide a structural formation and combination of parts whereby the articles being cooked are subjected to steam or vapor treatment during the ordinary cooking of the same, all as will hereinafter more fully appear.

In the accompanying drawing.

Like reference numerals indicate like parts in both views.

Figure 1:
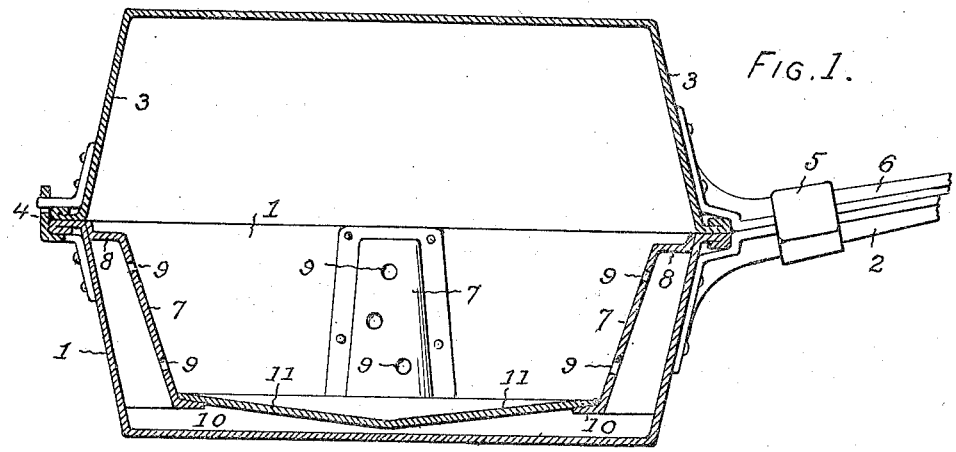
Fig. 1 is a central vertical section of a domestic cooking utensil having this invention applied.
Figure 2:
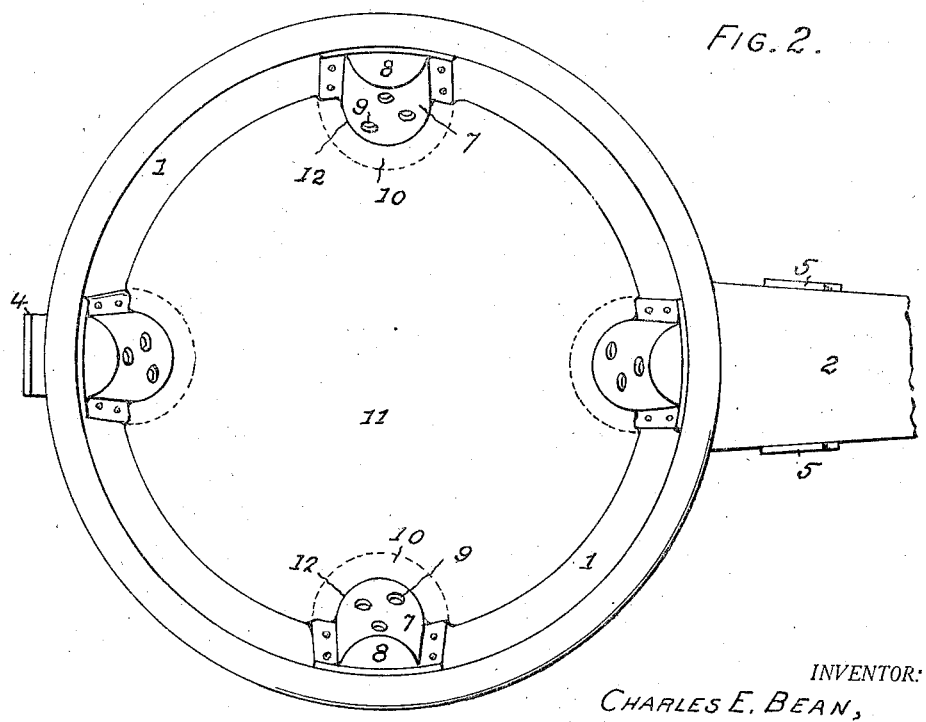
Fig. 2 is a top view of the utensil body, the cover portion being removed.

In the preferred form of the invention the body portion 1 of the utensil is of an upwardly flared and open top shell formation, provided with a lateral handle 2 for convenient manipulation, while the cover portion 3 is of a downwardly flared and open bottom form, with its margin fitting the margin of the body portion 1, in a close manner, and with the parts held in such condition by an open hinge connection 4 at one side and with side lugs 5 at the opposite side for frictional engagement with the lateral handle 6 of the cover portion 3.

In the present invention the flaring wall of the body portion 1 is provided on its inner surface and intermediate the height of the same with plurality of conduits 7 secured in spaced relation around said surface. The conduits 7 have a semi-circular form in cross-section and are of an increasing size from top to bottom as shown.

Each conduit 7 has a closed top 8, a series of orifices 9 intermediate its height and an outturned flange 10 adjacent to its open lower end and adapted to provide a support for the circulation partition now to be described.

The circulation partition 11 above referred to is preferably of the obtuse cone plate form shown and provided with a series of peripheral notches 12, semi-circular in form and adapting the partition to the aforesaid conduits 7 with the margins of the notches 12 resting upon the flanges 10 of said conduits to support the partition 11 a distance above the bottom wall of the main body 1 of the utensil.

The described construction is adapted in actual use to afford a very effective steaming action on articles of food being cooked, when a shallow depth of water is contained in the bottom part of the main body 1 in the chamber beneath the partition 11, in that the steam arising from the body of water in a heated condition will be directed to the conduits 7, through the same, and through the orifices 9 thereof, in an inward direction upon and against the articles undergoing a cooking operation, as such articles rest upon the central portion of the partition 11.

Having thus fully described my invention, what I claim and desire to secure by Letters Patent, is:—

1. In a domestic cooking utensil, a main body portion of an upwardly flared and open top form, a plurality of conduits arranged intermediate the height of the wall of the body portion, each having a closed upper end, an open lower end, an out turned flange adjacent to such lower end, and series of orifices intermediate the height of the conduit, and a peripherally notched partition resting upon the flanges of the conduits to maintain the partition a distance above the bottom wall of the body portion of the utensil.

2. In a domestic cooking utensil, a main body portion of an upwardly flared and open top form, a plurality of conduits arranged intermediate the height of the wall of the body portion, each having a tapering semi-circular form and provided with a closed upper end, an open lower end, an out turned flange adjacent such lower end and a series of orifices intermediate its height, and a peripherally notched partition resting upon the flanges of the conduits to maintain the partition a distance above the bottom wall of the body portion of the utensil.

Signed at Kansas City, Kansas, August, 1926.

CHARLES EVANS BEAN.